United States Patent Office 3,458,474
Patented July 29, 1969

3,458,474
POLYAMIDES STABILIZED WITH
COPPER CHELATES
Hans Wilhelm, Ludwigshafen (Rhine), Gerhard Mueller, Limburgerhof, Pfalz, Richard Pflueger, Bietigheim (Enz), and Helmut Doerfel, Ludwigshafen (Rhine), Germany, assignors to Badische Anilin- & Soda-Fabrik, Aktiengesellschaft, Ludwigshafen (Rhine), Germany
No Drawing. Filed Oct. 18, 1966, Ser. No. 587,401
Claims priority, application Germany, Oct. 29, 1965, B 84,304
Int. Cl. C08g 51/62, 51/56
U.S. Cl. 260—45.75      6 Claims

ABSTRACT OF THE DISCLOSURE

A synthetic linear polyamide stabilized against the action of heat and light by incorporation therein of about 0.01 to 0.5% by weight of a copper complex of an $\alpha,\alpha$-disubstituted polymethylene-bis-iminoacetic acid together with about 0.05 to 2.5% by weight of the iodide of an alkali metal, an alkaline earth metal, ammonia or an amine.

---

This invention relates to a method of stabilizing polyamides against the action of heat and light with a mixture of a halogen compound and a copper complex having the general grouping

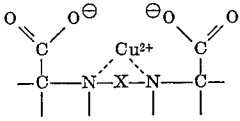

where X denotes a chain of from 2 to 12 atoms and their substituents.

It is known to add copper or copper compounds, for example copper oxide, copper hydroxide or copper salts of organic or inorganic acids to polyamides to stabilize them against the action of heat and air. Since however the best polymers are obtained by adding the stabilizers to the polyamide-forming starting materials, only those copper compounds can be used that readily dissolve or can be dispersed in the starting mixture, as otherwise undesirable agglomerates may form. Another disadvantage is that same copper compounds that are soluble in polyamide-forming starting materials, e.g. cupric acetate, when used alone lose their stabilizing effect during the condensation and processing into fibers.

It is also known that by adding complex-forming agents for copper compounds not only are the solubility and dispersibility of copper compounds in polyamide-forming starting materials, polycondensation mixtures and polyamides improved, but also their heat-stabilizing action. Suitable complex-forming agents that may be used in combination with copper compounds are for example phosphorous compounds such as phosphoric acid salts, phosphorous acid salts and salts of hydrogen halides. It is a disadvantage, that e.g. phosphoric acid salts affect the degree of polycondensation, whereas salts of hydrogen halides may cause minute cracks, e.g. in polyamide filaments.

It is also known that polyamides may be stabilized by adding a combination of copper compounds, e.g. copper acetate, and elementary chlorine. Such additives, however, strongly attack the reaction vessels.

It is an object of the present invention to provide an improvement in the stabilization of polyamides against the action of light and heat.

This object is achieved by adding to the polyamide a mixture of 0.01 to 0.5% by weight, based on the polyamide, of a copper complex and 0.05 to 2.5% by weight of a halogen compound, said copper complex containing the general grouping

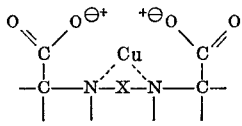

where X denotes a chain of 2 to 12 atoms and their substituents.

According to a preferred embodiment of the invention the polyamides are stabilized against the action of heat and light by adding the said copper complexes and the said halogen compounds to the polyamide-forming starting materials and reacting the latter to form polyamides by polycondensation or polyaddition.

Polymethylene-bis(imino acids) having the general formula

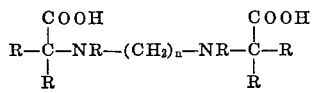

are especially suitable for producing the copper complex according to this invention.

In the above formula, the radicals R may be identical or different and may denote hydrogen or aliphatic, araliphatic or aromatic substituents. The latter may themselves be substituted, e.g. by hydrocarbon radicals, hydroxyl groups, alkoxy groups or halogen. Hydrogen atoms in the chain combining the two amino groups may be replaced with other radicals and the chain may be interrupted by hetero atoms. Examples of imino acids of the said kind are hexamethylene-bis($\alpha$-iminopropionic acid), tetramethylene-bis($\alpha$-iminoacetic acid), tetramethylene-bis($\alpha$-imino-$\alpha$-phenylpropionic acid), tetramethylene-bis-($\alpha$-iminophenylacetic acid), hexamethylene-bis($\alpha$-iminophenylacetic acid), tetramethylene-bis($\alpha$-imino-$\beta$-phenylpropionic acid), trimethylhexamethylene-bis(iminophenylacetic acid), octamethylene-bis(iminophenylacetic acid), dodecamethylene-bis(iminoethylacetic acid), N,N'-diethyltetramethylene-bis(iminophenylacetic acid), N,N'-diethyltetramethylene-bis(iminoethylacetic acid), bis($\beta$-iminophenylacetic acid ethyl)ether and particularly tetramethylene-bis($\alpha$-imino-p-hydroxyphenylacetic acid).

No claim is made herein to the production of the said acids and their complex copper salts. They may be produced for example according to the principle of the Strecker synthesis by reacting $\alpha$-halo-fatty acids with diamines, by reacting dihalogen hydrocarbons with amino esters or by carboxymethylation, i.e. by reacting diamines with alkali cyanides and aldehydes under strongly alkaline conditions. The reaction of aldehydes with salts of diamines and potassium cyanide is particularly preferred. Polymethylene-bis($\alpha$-iminonitriles) are obtained which afford acids on hydrolysis.

The complex copper salt of the said acids which is used for stabilization and has the general formula

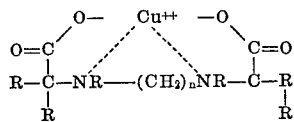

can be obtained by reacting the bis-iminoacids with copper salts, e.g. copper carbonate. The copper salt is advantageously used for stabilization in an amount of 0.01 to 0.5%, preferably 0.06 to 0.26%. The amount depends on the substituent R and the chain length $n$ in the above formula and can be easily determined by simple experiments.

Examples of halogen compounds that may be used in admixture with the copper complexes of imino acids are alkali metal iodides, alkaline earth metal iodides, ammonium iodide and iodides of amines, particularly diamines. The amount of halogen compound may be up to five times the amount of copper compound.

The stabilizer composition according to this invention may be used for stabilizing all polyamides and copolyamides obtained from the usual polyamide-forming compounds, i.e. lactams, salts of diamines and dicarboxylic acids, and aminocarboxylic acids. The composition may be added prior to or during condensation or during the processing of the ready-made condensate. The mixture of an iodine compound and the copper complex of an imino acid may be readily dispersed in the polyamide-forming compounds to be condensed or it may be added during processing without difficulty.

It is surprising that the copper complexes, which themselves contain polyamide-forming components, should not interfere with the chain formation during condensation and should give paler polyamides then the conventional stabilizers. Stabilizer compositions according to this invention are superior to the phenolic type antioxidants hitherto used and also to the conventional copper compounds and copper complexes.

Copper complexes of the type according to this invention have not hitherto been used as stabilizers. By choosing the substituent R the stabilizer may be adapted to the particular polyamide.

The copper salts having a very high decomposition point, their stabilizing effect continues for a long period even during prolonged exposure to heat and in particular to high temperature.

Polyamides stabilized according to the present invention lend themselves to the production of any kind of moldings by injection molding, extrusion or casting methods. They are also suitable for the production of textile fibers, ribbons, sheet and film.

The invention is further illustrated by the following examples in which the parts specified are by weight. The K values have been determined according to the method of H. Fikentscher, "Cellulose-chemie," 13, 58 (1932).

Example 1

100 parts of caprolactam is polycondensed for 3 hours at 270° C. with 20 parts of water, 0.06 part of the copper salt of tetramethylene-bis(iminophenylacetic acid) and 0.34 part of potassium iodide. The K value of the polycondensate is 62 and rose to 70 upon annealing for 15 days at 140° C. After another 15 days the K value is found to have dropped by only 1.5 units. The light absorption is 48% prior to annealing, 65% after 15 days and 69% after 30 days. The polycondensate is not brittle after this time.

Example 2

100 parts of caprolactam is mixed with 0.13 part of the copper salt of tetramethylene-bis(iminophenylacetic acid), 0.13 part of potassium iodide and 20 parts of water and the mixture is polycondensed as described in Example 1. The K value of polyamide is 68. After 15 days' storage at 140° C., in air it is 75 and after another 30 days 72.3. The product is not brittle after 45 days. The light absorption is 49% prior to the heat treatment, 60% after 15 days and 71% after 30 days.

Example 3

100 parts of caprolactam is mixed with 20 parts of water, 0.26 part of the salt of tetramethylene-bis(iminophenylacetic acid) and 1.36 parts of potassium iodide and the mixture polycondensed as described in Example 1. The K value of the polycondensate is 66, after 15 days' storage at 140° C. in air 75, and after another 15 days 72. The light absorption is 48% prior to the heat treatment, 75% after 15 days and 77% after 30 days.

Example 4

60 parts of hexamethylene diammonium adipate and 40 parts of caprolactim are mixed with 0.06 part of the copper salt of tetramethylene-bis(iminophenylacetic acid), 0.34 part of potassium iodide and 20 parts of water and the mixture is polycondensed for 3 hours at 270° C. The resultant polycondensate has a K value of 74 which rises to 86 during 3 days' storage at 140° C. in air. The light absorption is 22% after the heat treatment 42%. The polycondensate exhibits no brittleness after the heat treatment.

Example 5

60 parts of hexamethylene diammonium adipate and 40 parts of caprolactam are mixed with 20 parts of water, 0.13 part of the copper salt of tetramethylene-bis(iminophenylacetic acid) and 0.34 part of potassium iodide and the mixture is polycondensed as described in Example 1. The K value is 72 and rises to 85 after 3 days' storage at 140° C. The light absorption is 27% and after the heat treatment 45%.

Example 6

60 parts of hexamethylene diammonium adipate and 40 parts of caprolactam are mixed with 20 parts of water, 0.26 part of the copper salt of tetramethylene-bis(iminophenylacetic acid) and 0.7 part of potassium iodide and the mixture is polycondensed as described in Example 1. The K value is 74 and rises to 84 after 3 days' storage at 140° C. The light absorption of the polycondensate is 29 and after the 3 days' heat treatment 51%.

We claim:

1. A composition of matter stabilized against heat and light comprising a synthetic linear polyamide in which there has been incorporated:

(a) about 0.01 to 0.5% by weight, with reference to the polyamide, of a copper complex of the formula

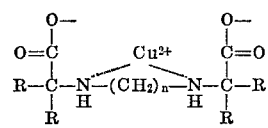

wherein R denotes a radical selected from the group consisting of hydrogen, alkyl, aralkyl and aryl, and $n$ denotes an integer of 2 to 12; and (b) about 0.05 to 2.5% by weight, with reference to the polyamide, of an iodide selected from the group consisting of alkali metal iodides, alkaline earth metal iodides, ammonium iodide and iodides of amines.

2. A composition of matter stabilized against heat and light comprising a synthetic linear polyamide in which there has been incorporated:

(a) about 0.01 to 0.5% by weight, with reference to the polyamide, of a copper complex of the formula

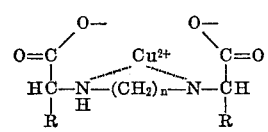

wherein R denotes a radical selected from the group consisting of hydrogen, methyl, phenyl and hydroxyphenyl, and $n$ denotes an integer of 2 to 6; and (b) about 0.05 to 2.5% by weight, with reference to the polyamide, of an iodide selected from the group consisting of alkali metal iodides, alkaline earth metal iodides and ammonium iodide.

3. A composition as claimed in claim 2 wherein the amount of the copper complex is about 0.06 to 0.26% by weight, with reference to the polyamide.

4. A composition as claimed in claim 2 wherein component (a) is the copper complex of tetramethylene-bis-iminophenylacetic acid.

5. A composition as claimed in claim 2 wherein component (a) is the copper complex of tetramethylene-bis-$\alpha$-iminoacetic acid.

6. A composition as claimed in claim 2 wherein component (a) is the copper complex of tetramethylene-bis-$\alpha$-imino-p-hydroxyphenylacetic acid.

References Cited

UNITED STATES PATENTS 2,705,227   3/1955   Stamatoff _____ 260—45.7

DONALD E. CZAJA, Primary Examiner
V. P. HOKE, Assistant Examiner

U.S. Cl. X.R.
260—45.7, 78